United States Patent [19]

Lenox et al.

[11] 4,434,007
[45] Feb. 28, 1984

[54] PROCESS FOR REPRODUCIBLY PREPARING UNIFORM DRY INK COMPOSITIONS COMPRISING WATER-SOLUBLE CATIONIC DYESTUFFS

[75] Inventors: Ronald S. Lenox, East Hempfield Township, Lancaster County; Moses Sparks, Jr., Manheim Township, Lancaster County, both of Pa.

[73] Assignee: Armstrong World Industries, Inc., Lancaster, Pa.

[21] Appl. No.: 405,261

[22] Filed: Aug. 4, 1982

[51] Int. Cl.$^3$ ............................................. C09D 11/14
[52] U.S. Cl. ...................................... 106/26; 106/20; 106/23; 524/543
[58] Field of Search ...................... 106/26, 22, 20, 23; 524/543

[56] References Cited

U.S. PATENT DOCUMENTS

| | | | |
|---|---|---|---|
| 4,105,572 | 8/1978 | Gorondy | 252/62.1 P |
| 4,145,300 | 3/1979 | Hendriks | 252/62.1 P |
| 4,246,331 | 1/1981 | Mehl et al. | 430/107 |

*Primary Examiner*—John Kight, III
*Assistant Examiner*—Amelia B. Yarbrough
*Attorney, Agent, or Firm*—Laird F. Miller

[57] ABSTRACT

The present invention concerns our discovery that a water-soluble cationic dye and binder composition may be dissolved in a solvent, and, optionally, a magnetic material may be uniformly dispersed within said solvent solution. The resulting solution or mixture is agitated with a hot water solution comprising an ionizable salt whereby there is essentially no partitioning of the cationic dyestuff into the aqueous phase. During the intermixing step, the solvent is driven off, thereby providing a solid mixture of ink which may be pulverized and used in a wide variety of printing processes.

20 Claims, No Drawings

PROCESS FOR REPRODUCIBLY PREPARING UNIFORM DRY INK COMPOSITIONS COMPRISING WATER-SOLUBLE CATIONIC DYESTUFFS

The present invention relates to dry ink compositions and, more particularly, to dry ink compositions comprising cationic dyes which are useful in magnetic printing processes.

BACKGROUND OF THE INVENTION

Printing compositions comprising pigments or dyes have long been known in the art. Conventionally, printing inks have comprised solvents and one or more colorants whereby the inks have been applied by conventional printing processes. In recent years, dry ink compositions have come into wide use through the development of processes such as transfer printing, electrostatic printing and magnetic printing. Thus, industry has spent a substantial amount of time and effort to develop processes which are useful to prepare dry ink compositions.

THE PRIOR ART

Dry ink compositions which are presently available usually comprise a binder in which is dispersed a colorant. Such inks were initially made by selecting a solvent for the binder and the colorant (the colorant being dissolvable or dispersable in the solvent) and then evaporating the mixture to produce a solid product. However, the product which was obtained was generally unsatisfactory because the colorant was non-uniformly dispersed throughout the solid matrix. U.S. Pat. Nos. 3,830,750 and 4,105,572 contain background information relating to the production of dry ink compositions.

Basically, two general processes are presently in use for producing such compositions. These are melt extrusion techniques and spray drying techniques. Melt extrusion involves the preparation of a heat-softened resin which is mixed with a colorant to form a dispersion of material that is then cooled and pulverized to provide a powdered ink composition. This technique is generally unsatisfactory with respect to cationic dyestuffs, however, because these dyestuffs tend to be heat sensitive or subject to oxidative degradation. Furthermore, certain resins which do not extrude well or which thermally degrade cannot be satisfactorily intermixed with cationic dyes using this technique. For example, very high molecular weight polyvinyl chloride and high molecular weight ethyl cellulose resins do not process well using melt extrusion techniques.

The other basic technique, spray drying, involves the preparation of a solution or dispersion of dye and binder in a solvent which is then sprayed into a drying chamber. In the drying chamber the solvent evaporates leaving fine particles of ink. Spray drying is not particularly desirable for several reasons. It involves the use of large and expensive equipment; there are pollution, fire and health hazards associated with the evaporation of the commonly used organic solvents in the heated drying chamber; and rigorous cleaning of the apparatus is required if different dye colors are to be prepared using a single unit. Furthermore, particularly with respect to cationic dyes, heat stability problems may be encountered during the drying process.

A third technique which has not found wide acceptance is disclosed in U.S. Pat. No. 3,679,612. This invention was directed to the production of substantially spherical ink particles which were intended for use in electrostatic printing processes. The process involved the dissolution of a binder in a solvent, after which a colorant was dissolved or dispersed in the solution. The resulting solution or mixture was then dispersed in an inert non-solvent. The solvent preferably had a lower boiling point than the non-solvent so that, when the intermixed material was heated, the solvent evaporated leaving a solid material behind. The solid was then dried using a spray drying process. A preferred system comprised methylene chloride as the solvent and water as the non-solvent.

This technique has been shown to be useful to prepare ink compositions comprising disperse dyes when water is the non-solvent because disperse dyes do not partition into the water. However, it has proved to be generally inapplicable to cationic dyes, because these dyes tend to be water soluble. Upon dispersing a solution or dispersion of a cationic dye and binder in an aqueous non-solvent, the cationic dye often partitions into the non-solvent. The solid which is produced thus has a non-uniform character and frequently is encrusted with dry dye powder. Thus, it is difficult, if not impossible, to use this method to prepare dry ink compositions wherein the color contents are adequately controlled.

Accordingly, one objective of the present invention is to provide a process for preparing dry ink compositions comprising a cationic dye and a binder.

Yet another objective of the present invention is to provide a process for preparing magnetic toners whereby the toner comprises a magnetic material, a binder and a uniformly dispersed cationic dye.

These and other objectives of the present invention will become apparent from the detailed description of the preferred embodiments which follow.

SUMMARY OF THE INVENTION

The present invention concerns our discovery that a water-soluble cationic dye and binder composition may be dissolved in a solvent, and, optionally, a magnetic material may be uniformly dispersed within said solvent solution. The resulting solution or mixture is agitated with a hot water solution comprising an ionizable salt whereby there is essentially no partitioning of the cationic dyestuff into the aqueous phase. During the intermixing step, the solvent is driven off, thereby providing a solid mixture of ink which may be pulverized and used in a wide variety of printing processes.

DETAILED DESCRIPTION OF THE PREFERRED EMBODIMENTS

In one embodiment the present invention comprises a process for producing a dry ink composition comprising a cationic dye, said process comprising the steps of preparing an organic phase comprising a solution of at least one water-soluble cationic dye and a binder in a suitable organic solvent, said organic phase optionally comprising magnetic particles substantially uniformly suspended therein, said solvent having a boiling point lower than that of water or being capable of forming an azeotrope with water, said azeotrope having a boiling point lower than that of water; intermixing said organic phase with an aqueous solution comprising an ionizable salt, sufficient ionizable salt being present to substantially prevent partition of said dye into said aqueous solution, the temperature of said aqueous solution being not less than said boiling point, said solvent being volatilized during intermixing thereby causing a substantially homogeneous solid mixture comprising said dye, binder and optional magnetic particles to precipitate; separating and drying said solid mixture; and pulverizing said solid mixture to obtain a desired particle size range.

In a second embodiment the present invention comprises a dry ink composition comprising at least one water-soluble cationic dye, a binder and, optionally, magnetic particles, said composition having been obtained by preparing an organic phase comprising a solution of said dye and binder in a suitable organic solvent, said optional magnetic particles being substantially uniformly suspended therein, said solvent having a boiling point lower than that of water or being capable of forming an azeotrope with water, said azeotrope having a boiling point lower than that of water; intermixing said organic phase with an aqueous solution comprising an ionizable salt, sufficient ionizable salt being present to substantially prevent partition of said dye into said aqueous solution, the temperature of said aqueous solution being not less than said boiling point, said solvent being volatilized during intermixing thereby causing a substantially homogeneous solid mixture comprising said dye, binder and optional magnetic particles to precipitate; separating and drying said solid mixture; and pulverizing said solid mixture to obtain a desired particle size range.

Applicants have discovered that inks comprising cationic dyes and binder may be uniformly prepared so as to be useful in a wide variety of transfer printing and magnetic printing processes. The problems normally encountered with the partitioning of cationic dyes into water, and the non-uniform inks resulting therefrom, are avoided. Furthermore, the problems encountered when cationic dyes are subjected to the conditions of the aforementioned spray drying or melt extrusion techniques are avoided, and the resulting toners are substantially less expensive than toners produced by these commonly used techniques. In addition, the present invention is also remarkably useful to produce toners which are usable to produce images having fine, sharp detail. Such toners are particularly adaptable to transfer print difficult-to-print substrates such as polyvinyl chloride.

The solvent which is selected should be suitable to dissolve both the binder resin and the dye. This solvent may be miscible or immiscible with the hot water quenching bath with which it will ultimately be mixed; however, it should have a boiling point which is lower than that of water or, alternatively, it should form an azeotrope with water, in which case the azeotrope should have a boiling point which is lower than that of water. These boiling characteristics are desirable because residual solvent is detrimental in the final product, causing caking of the toner and vapor formation during the heating which is necessary to effect dye transfer. The presence of such vapors during transfer can lead to indistinct images. Solvents which have given very satisfactory results are acetone, methylene chloride, methanol, ethanol, tetrahydrofuran, chloroform and methyl ethyl ketone.

Optionally, a magnetic material such as particles of finely divided iron, iron oxide or chromium dioxide will be present. When such particles are included in the solvent solution, the viscosity of said solution should be adjusted such that the particulate matter remains suspended. Too low a viscosity simply results in the magnetic material settling out. Preferably the viscosity is controlled by adjusting the binder/solvent ratio.

A wide variety of resins will be adaptable to practice the present invention including polyvinyl chloride, polyacrylate, polyvinylidene chloride, polyethylene, polystyrene, copolymers of vinyl acetate and ethylene, melamine formaldehyde resins, organo polysiloxane resins, aldehyde resins, ketone resins, cellulose resins, epoxy resins, epoxy modified resins, phenol/formaldehyde resins, acrylic resins, and many others. Resins of these types comprise both thermoplastic and thermosetting resins. Examples of those resins which will be suitable are set forth in U.S. Pat. No. 3,679,612, said listing being provided by way of illustration and not by way of limitation.

Where the resulting ink composition will be used in transfer printing processes, other considerations should also be taken into account in selecting the resin or binder. For example, certain binders such as polyvinyl alcohol or polyvinyl acetate will interfere with or impede the migration of the cationic dyes when they are subjected to the transfer printing process. Accordingly, a binder should be selected which does not cause this effect. Examples of binders which have given superior results are polyvinyl acetals, such as polyvinylbutyral; cellulose ethers, such as ethylcellulose and methylcellulose; and mixtures thereof. Such binders, however, are not restricted to use only for transfer printing processes.

The solvent composition may also contain other ingredients. For example, solutions comprising cationic dyes and binders have shown a tendency to gel when aged for several hours. Such gelling may be avoided by adding a basic stabilizer which does not substantially affect the color of the dye. Amines, and particularly tertiary amines, have provided good results. One such tertiary amine is N,N,N',N'-tetramethylethylene diamine which has served not only as an anti-gelling agent but also as a dispersant for the magnetic particles, when present. Typically, the stabilizer is used at a level of from about 0.1 to about 5% of the total weight of the solvent composition.

Anti-static additives may also be included to improve the properties of the dry ink compositions. Such compounds are well known in the art and include additives such as monomeric and polymeric quaternary ammonium salts.

Virtually any ionizable salt can be used to practice the present invention, provided that it does not interact unfavorably with the dye. This salt is dissolved in water at a level which is suitable to substantially prevent partition of the cationic dye between the organic solvent phase and the aqueous phase. As a general rule, it is preferable to select ionizable salts that comprise an anion which is identical or very similar to that of the cationic dye. In this way, a detrimental exchange of the anion of the cationic dye is precluded. Although instances where detrimental results have been obtained due to this phenomenon are rare, the possibility exists. Accordingly, the use of an ionizable salt with a common or very similar anion is recommended, chloride or sulfate salts being preferred because they represent the counter ion in most cationic dyes.

The quantity of salt which is utilized will depend to a great extent on the partitionability of the cationic dye. Some cationic dyes will tend to partition more readily than others, and the solvent which is used may also affect the amount of partitioning; accordingly, a greater quantity of salt would be required to prevent partitioning in such circumstances. Generally, about one pound of ionizable salt for each one gallon of water is preferred, although the quantity of salt which is selected is largely a matter of choice to the artisan.

When practicing the present invention, the intermixing of the solvent and non-solvent will be accomplished when the temperature of the aqueous non-solvent is above that of the solvent. Preferably, the water induces the solvent to volatilize rapidly, thereby causing a rapid and uniform precipitation of the solid ink composition.

Once the solid has precipitated, it may be separated by decantation or filtration, dried, and then pulverized by conventional techniques to produce an ink which is usable in the desired process. The objective, of course, is to provide a solid material which has the dye uniformly distributed throughout so that even deposition of dye is achieved during the selected printing process.

The advantages and utility of the present invention will become apparent from the examples which follow.

EXAMPLE I

A control toner comprising basic red 22 dye (Atacryl Red ALB; unspecified counter ion) was prepared in the following manner. A solution was prepared comprising 2295 ml of methlyene chloride, 450 ml of methanol, 423 g of polyvinylbutyral binder, 31.5 g of basic red 22 dye and 13.5 g of N,N,N',N'-tetramethylethylene diamine stabilizer by stirring for about 2 hours. When all of the components were dissolved, 477 g of iron oxide (MO-7029 from Pfizer) was suspended to form a mixture whose viscosity was such that the solid particles did not settle out. The suspended material was quickly poured into a bath of rapidly stirred water maintained at about 90° C., thereby causing the methylene chloride to flash off. The solid material settled to the bottom of the bath and was separated; however, a substantial amount of dye partitioned into the water as evidenced by a deep red color. Furthermore, the precipitated material, when separated, contained a crust of dye particles, indicating that the dye was not uniformly dispersed throughout the solid. This material gave generally unsatisfactory results when used as a toner.

EXAMPLE II

A second sample was prepared by dissolving 100 g of polyvinylbutyral binder, 10 g of the same basic red 22 dye and 2 g of N,N,N',N'-tetramethylethylene diamine in 2295 ml of methylene chloride and 450 ml of methanol. After a solution was obtained, 105 g of iron oxide was suspended to form a mixture.

A rapidly stirred hot water bath was prepared at 90° C., the bath containing 2 pounds of sodium chloride and 1 pound of calcium chloride for every 3 gallons of water. The solvent suspension was quickly poured into this water solution, thereby inducing precipitation of the solid. In this instance, however, virtually none of the dye partitioned into the water as evidenced by the lack of color of the aqueous solution. Furthermore, when separated, the solid material had dye uniformly dispersed throughout and had essentially no dye crust as had been the case for Example I.

EXAMPLES III-VII

Examples III-VII illustrate experiments which establish the superiority of the present invention over the prior art process where a room-temperature quenching bath comprising no ionizable salt was used. A solvent composition containing the indicated ingredients was prepared for each example and 100 ml of each composition was poured into each of the following quenching baths:

a. 320 ml of a solution comprising water and 80 g of sodium chloride at 90° C.
b. 320 ml of water at 90° C.
c. 320 ml of a solution comprising water and 80 g of sodium chloride at 25° C.
d. 320 ml of water at 25° C.

After intermixing was complete, the 25° C. samples (samples c and d) were warmed to a temperature sufficient to drive off the solvent and precipitate the toner. The ultraviolet absorbance of each aqueous phase was then measured at a wavelength corresponding to a UV maximum for the dye. Comparison of the results indicated, in all instances, that less partitioning occurred for samples that were intermixed with the hot, salt-containing water solution.

EXAMPLE III

The solvent mixture comprised the following ingredients:

| Ingredient | Weight (grams) |
| --- | --- |
| Ethyl cellulose | 154 |
| Basic red 22 (Sandocryl Red BBL; unspecified counter ion) | 12 |
| Magnetic oxide (Pfizer MO-7029) | 160 |
| N,N,N',N'—Tetramethylethylene diamine | 4 |
| Acetone | 1,200 |

After intermixing the solvent solution and precipitating the toner, the absorbance of samples from each aqueous bath was measured at 370 nm, as follows:

| Sample | Absorbance (370 nm) |
| --- | --- |
| IIIa | 0.935 |
| IIIb | 1.477 |
| IIIc | 1.255 |
| IIId | 2.030 |

The hot salt bath (IIIa) is seen to have less partitioned dye than any of the other three samples.

EXAMPLE IV

The solvent mixture comprised the following ingredients:

| Ingredient | Weight (grams) |
| --- | --- |
| Ethyl cellulose | 154 |
| Basic red 22 (Sandocryl Red BBL; unspecified counter ion) | 12 |
| Magnetic oxide (Pfizer MO-7029) | 160 |
| N,N,N',N'—Tetramethylethylene diamine | 2 |
| Methylene chloride | 1,200 |

After intermixing the solvent solution and precipitating the toner, the absorbance values were measured as described for Example III.

| Sample | Absorbance (370 nm) |
| --- | --- |
| IVa | 0.692 |
| IVb | 1.710 |
| IVc | 2.400 |
| IVd | 1.260 |

As before, the hot salt bath (IVa) gave superior results.

EXAMPLE V

The solvent mixture comprised the following ingredients:

| Ingredient | Weight (grams) |
| --- | --- |
| Polyvinyl acetate | 194 |
| Basic green 4 (chloride counter ion) | 8 |
| Magnetic oxide (Pfizer MO-7029) | 160 |
| N,N,N',N'—Tetramethylethylene diamine | 2 |
| Methylene chloride | 1,000 |

The absorbance values for these solutions were measured at 474 nm.

| Sample | Absorbance (475 nm) |
| --- | --- |
| Va | 0.191 |
| Vb | 1.095 |
| Vc | 0.316 |
| Vd | 0.317 |

The hot salt bath (Va) was again superior.

EXAMPLE VI

The solvent mixture comprised the following ingredients:

| Ingredient | Weight (grams) |
| --- | --- |
| Ethyl cellulose | 154 |
| Basic blue 66 (Atacryl Blue LLB; unspecified counter ion) | 10 |
| Magnetic oxide (Pfizer MO-7029) | 160 |
| N,N,N',N'—Tetramethylethylene diamine | 2 |
| Tetrahydrofuran | 550 |
| Acetone | 600 |
| Ethanol | 600 |

The absorbance values were recorded at 380 nm to give the following:

| Sample | Absorbance (380 nm) |
| --- | --- |
| VIa | 0.055 |
| VIb | 2.79 |
| VIc | 0.133 |
| VId | 2.59 |

Again, the hot salt bath (VIa) gave superior results.

EXAMPLE VII

The solvent mixture comprised the following ingredients:

| Ingredient | Weight (grams) |
| --- | --- |
| Ethyl cellulose | 154 |
| Basic blue 66 (Atacryl Blue LLB; unspecified counter ion) | 10 |
| Magnetic oxide (Pfizer MO-7029) | 160 |
| N,N,N',N'—Tetramethylethylene diamine | 2 |
| Chloroform | 1,000 |

The absorbance values were measured as described for Example VI, again indicating the superiority of the hot salt bath (VIIa).

| Sample | Absorbance (380 nm) |
| --- | --- |
| VIIa | 0.066 |
| VIIb | 0.107 |
| VIIc | 0.206 |
| VIId | 0.490 |

EXAMPLE VIII

This example illustrates that the same aqueous nonsolvent may be used to prepare toners comprising different dyes without adverse results. Two different solvent mixtures were prepared as follows:

| Ingredient | Weight Toner VIIIa | Weight Toner VIIIb |
| --- | --- | --- |
| Ethyl cellulose | — | 1.57 lbs. |
| Polyvinylbutyral | 3.15 lbs. | 1.57 lbs. |
| Basic blue 26 (chloride counter ion) | 18.2 g | — |
| Basic yellow 13 (chloride counter ion) | — | 63.8 g |
| Magnetic oxide (Pfizer MO-7029) | 3.55 lbs. | 3.55 lbs. |
| N,N,N',N'—Tetramethylethylene diamine | 28.0 g | 28.0 g |
| Methylene chloride | 24.69 lbs. | 24.9 lbs. |
| Methanol | 3.09 lbs. | 3.09 lbs. |

A 40-gallon water bath containing 40 pounds of sodium chloride was heated to 90° C. and toner VIIIa was quickly poured in with rapid stirring. After the solvent was removed, the precipitated toner was separated and the bath was filtered. No coloration was observed. The bath was reheated to 90° C. and toner VIIIb was added in the same manner. Examination of the recovered toner showed no color contamination, and no dye partitioned into the water solution.

The present invention is not restricted solely to the descriptions and illustrations provided above but encompasses all modifications envisaged by the following claims.

What is claimed is:

1. A process for producing a dry ink composition comprising a cationic dye, said process comprising the steps of preparing an organic phase comprising a solution of at least one water-soluble cationic dye and a binder in a suitable organic solvent, said organic phase optionally comprising magnetic particles substantially uniformly suspended therein, said solvent having a boiling point lower than that of water or being capable of forming an azeotrope with water, said azeotrope having a boiling point lower than that of water;

intermixing said organic phase with an aqueous solution comprising an ionizable salt, sufficient ionizable salt being present to substantially prevent partition of said dye into said aqueous solution, the temperature of said aqueous solution being not less than said boiling point, said solvent being volatilized during intermixing thereby causing a substantially homogeneous solid mixture comprising said dye, binder and optional magnetic particles to precipitate;

separating and drying said solid mixture; and pulverizing said solid mixture to obtain a desired particle size range.

2. The invention as set forth in claim 1 hereof wherein said organic phase comprises a solvent which is immiscible with said aqueous solution.

3. The invention as set forth in claim 1 hereof wherein said organic phase comprises a solvent which is miscible with said aqueous solution.

4. The invention as set forth in claim 1 hereof wherein said organic phase comprises at least one solvent selected from the group consisting of chloroform, methylene chloride, acetone, ethanol, methanol, tetrahydrofuran and methyl ethyl ketone.

5. The invention as set forth in claims 1, 2, 3 or 4 hereof wherein said organic phase comprises a basic stabilizer.

6. The invention as set forth in claim 5 hereof wherein said stabilizer is a tertiary amine.

7. The invention as set forth in claim 6 hereof wherein said tertiary amine is N,N,N',N'-tetramethylethylene diamine.

8. The invention as set forth in claims 1, 2, 3 or 4 hereof wherein said binder is a polyvinyl acetal, a cellulose ether, or a mixture thereof.

9. The invention as set forth in claim 8 hereof wherein said polyvinyl acetal is polyvinyl butyral, and said cellulose ether is selected from the group consisting of ethylcellulose and methylcellulose.

10. The invention as set forth in claims 1, 2, 3 or 4 hereof wherein said optional magnetic particles are selected from the group consisting of iron, iron oxide, chromium dioxide and mixtures thereof.

11. A dry ink composition comprising at least one water-soluble cationic dye, a binder and, optionally, magnetic particles, said composition having been obtained by
preparing an organic phase comprising a solution of said dye and binder in a suitable organic solvent, said optional magnetic particles being substantially uniformly suspended therein, said solvent having a boiling point lower than that of water or being capable of forming an azeotrope with water, said azeotrope having a boiling point lower than that of water;
intermixing said organic phase with an aqueous solution comprising an ionizable salt, sufficient ionizable salt being present to substantially prevent partition of said dye into said aqueous solution, the temperature of said aqueous solution being not less than said boiling point, said solvent being volatilized during intermixing thereby causing a substantially homogeneous solid mixture comprising said dye, binder and optional magnetic particles to precipitate;
separating and drying said solid mixture; and
pulverizing said solid mixture to obtain a desired particle size range.

12. The invention as set forth in claim 11 hereof wherein said organic phase comprises a solvent which is miscible with said aqueous solution.

13. The invention as set forth in claim 11 hereof wherein said organic phase comprises a solvent which is immiscible with said aqueous solution.

14. The invention as set forth in claim 11 hereof wherein said organic phase comprises at least one solvent selected from the group consisting of chloroform, methylene chloride, acetone, ethanol, methanol, tetrahydrofuran and methyl ethyl ketone.

15. The invention as set forth in claims 11, 12, 13 or 14 hereof wherein said organic phase comprises a basic stabilizer.

16. The invention as set forth in claim 15 hereof wherein said stabilizer is a tertiary amine.

17. The invention as set forth in claim 16 hereof wherein said tertiary amine is N,N,N',N'-tetramethylethylene diamine.

18. The invention as set forth in claims 11, 12, 13 or 14 hereof wherein said binder is a polyvinyl acetal, a cellulose ether, or a mixture thereof.

19. The invention as set forth in claim 18 hereof wherein said polyvinyl acetal is polyvinyl butyral, and said cellulose ether is selected from the group consisting of ethylcellulose and methylcellulose.

20. The invention as set forth in claims 11, 12, 13 or 14 hereof wherein said optional magnetic particles are selected from the group consisting of iron, iron oxide, chromium dioxide and mixtures thereof.

* * * * *